US010762347B1

(12) United States Patent
Caulkins et al.

(10) Patent No.: US 10,762,347 B1
(45) Date of Patent: Sep. 1, 2020

(54) WAVEFORM GENERATION AND RECOGNITION SYSTEM

(71) Applicants: David Andrew Caulkins, Dallas, TX (US); Jerry A. Beers, Frisco, TX (US); Matt E. Hart, Lunenburg, MA (US); Collin R. Esmon, Geff, IL (US)

(72) Inventors: David Andrew Caulkins, Dallas, TX (US); Jerry A. Beers, Frisco, TX (US); Matt E. Hart, Lunenburg, MA (US); Collin R. Esmon, Geff, IL (US)

( * ) Notice: Subject to any disclaimer, the term of this patent is extended or adjusted under 35 U.S.C. 154(b) by 321 days.

(21) Appl. No.: 15/990,493

(22) Filed: May 25, 2018

Related U.S. Application Data

(60) Provisional application No. 62/510,954, filed on May 25, 2017, provisional application No. 62/517,419, filed on Jun. 9, 2017.

(51) Int. Cl.
*G06K 9/62* (2006.01)
*G06K 9/00* (2006.01)
*G06K 9/34* (2006.01)
*G10L 25/51* (2013.01)
*G06K 9/42* (2006.01)

(52) U.S. Cl.
CPC ......... *G06K 9/0053* (2013.01); *G06K 9/0055* (2013.01); *G06K 9/00543* (2013.01); *G06K 9/00979* (2013.01); *G06K 9/34* (2013.01); *G06K 9/42* (2013.01); *G06K 9/6215* (2013.01); *G06K 9/6253* (2013.01); *G10L 25/51* (2013.01)

(58) Field of Classification Search
CPC ............. G06K 9/0053; G06K 9/00979; G06K 9/00543; G06K 9/34; G06K 9/6215; G06K 9/0055; G06K 9/42; G06K 9/6253; G10L 25/51
See application file for complete search history.

(56) References Cited

U.S. PATENT DOCUMENTS

| 5,634,020 | A | * | 5/1997 | Norton | G11B 27/034 |
| | | | | | 715/727 |
| 5,680,558 | A | * | 10/1997 | Hatanaka | G06F 16/10 |
| | | | | | 715/838 |
| 5,903,892 | A | | 5/1999 | Hoffert | |
| 6,036,094 | A | | 3/2000 | Goldman | |
| 6,348,773 | B1 | | 2/2002 | Dvorkis | |

(Continued)

FOREIGN PATENT DOCUMENTS

WO WO-2018129388 A1 * 7/2018 ......... G06F 3/04886

*Primary Examiner* — Carol Wang
(74) *Attorney, Agent, or Firm* — Quickpatents, LLC; Kevin Prince

(57) ABSTRACT

An optical code system for manipulating an optical code that represents an audio waveform present in an audio file, for example, includes a server, a database module, and a non-volatile storage system, all interconnected and preferably in communication with a network to remote users. The system includes two primary sub-systems: a code generating system and a code matching system. The code generating system generates an optical code based on the audio waveform, such an optical code being subsequently scanned and identified by the code matching system. As such, once the code matching system matches an optical code to a particular audio waveform, the associated audio file and associated waveform data may be delivered to the user.

29 Claims, 14 Drawing Sheets

(56) References Cited

U.S. PATENT DOCUMENTS

| | | |
|---|---|---|
| 6,995,309 B2 | 2/2006 | Samadani |
| 7,174,293 B2 | 2/2007 | Kenyon |
| 7,277,766 B1 | 10/2007 | Khan |
| 7,328,153 B2 | 2/2008 | Wells |
| 7,427,018 B2 | 9/2008 | Berkun |
| 8,009,966 B2 | 8/2011 | Bloom |
| 8,484,017 B1 | 7/2013 | Sharifi |
| 8,890,869 B2 * | 11/2014 | Duwenhorst ......... G06T 11/001 345/440 |
| 9,299,364 B1 | 3/2016 | Pereira |
| 9,313,359 B1 | 4/2016 | Stojancic |
| 9,372,548 B2 | 6/2016 | Yoshida |
| 9,639,606 B2 | 5/2017 | DeMers |
| 9,740,784 B2 | 8/2017 | Rothschild |
| 2006/0229878 A1 | 10/2006 | Scheirer |
| 2007/0038671 A1 | 2/2007 | Holm |
| 2008/0063271 A1 | 3/2008 | Shimodaira |
| 2010/0158310 A1 | 6/2010 | McQueen |
| 2010/0257129 A1 | 10/2010 | Lyon |
| 2010/0324707 A1 | 12/2010 | Chao |
| 2011/0113037 A1 | 5/2011 | Wessling |

* cited by examiner

WAVEFORM GENERATION AND RECOGNITION SYSTEM

CROSS-REFERENCE TO RELATED APPLICATIONS

This application claims the benefit of U.S. Provisional Patent Application 62/510,954, filed on May 25, 2017, as well as U.S. Provisional Patent Application 62/517,419, filed on Jun. 9, 2017, both incorporated herein by reference.

STATEMENT REGARDING FEDERALLY SPONSORED RESEARCH AND DEVELOPMENT

Not Applicable.

FIELD OF THE INVENTION

This invention relates to recognizing digital codes, and more particularly to a recognizing a digital code that shares a characteristic with information to which it is linked.

DISCUSSION OF RELATED ART

Many people recognize that an audio waveform can have a pleasing aesthetic appearance, and can be manipulated to produce visual art. While the art is pleasing on its own, there is no current means by which to match the image of an audio waveform with the original audio from which the artwork was produced. Instead, there are standard bar and dot-type codes, such as a QR or bar code, a uniform resource locator such as a URI, numeric code or filename, an RFID tag or a location reference such as a wireless beacon.

All of these types of codes, while effective, are not aesthetically pleasing when displayed next to waveform artwork. Moreover, these technologies can be expensive and detract from the aesthetic of the waveform, and must have an association with, or be linked in some manner with, both the artwork of the waveform, the library of content, and the matching image in a library and/or other metadata related to the waveform and the audio file associated therewith.

What is needed is a system that can use the image of the waveform artwork itself as a digital code, scanned or photographed using a variety of equipment, lighting conditions, sizes and quality. Such a needed system would match the image provided with the original data that created the artwork or with the audio waveform, and associate the image with data such as the audio waveform. In the case of an audio file, once the waveform artwork is identified by the system, the audio file could be played back to the user, so that the user can follow along with the waveform artwork to see that there is a relationship between the audio file and the waveform artwork. The present invention accomplishes these objectives.

SUMMARY OF THE INVENTION

The present device is an optical code system for manipulating an optical code that represents an audio waveform present in an audio file, for example. The audio file may be a standard .mp or .wve or other audio file format, or may be the audio portion of a video file, or the like.

The system includes a server, a database module, and a Non-Volatile Storage System (NVSS), all interconnected and preferably in communication with a network to remote users. The system includes two primary sub-systems, namely a code generating system and a code matching system. The code generating system generates an optical code based on the audio waveform, such an optical code being read and identified by the code matching system. As such, once the code matching system matches an optical code to a particular audio waveform, the associated audio file and associated waveform data may be delivered to the user. An important feature of the optical code is that it visually matches or resembles the actual audio waveform; that is to say, the optical code visually resembles the data to which it is linked. As such, the user can begin himself to recognize the optical code an associate the optical code to an audio signal or other data.

The code generating system comprises, at a minimum, a Waveform Extraction (WE) module, an Image Processing (IPROC) module, and a Delivery Module (DM), all of which are running on the server and resident in the NVSS.

The waveform extraction module receives the audio file from the user, preferably through a user interface, and extracts audio data from the audio file. The audio data is then sent to the image processing module that receives the audio data from the waveform extraction module and transforms the audio data into a waveform image of a predetermined size. The waveform image is normalized and rendered with a predetermined or user-set waveform color and areas in a background of the waveform image are rendered with a predetermined or user-set background color. The image processing module preferably includes a silence detection and removal (SDR) module, a peak intensity (PI) module, a wave interval adjustment (WIA) module, a color manipulation (CM) module, and an edging (EDGE) module.

As such, once the user selects a generated image through the user interface via the network, the optical code is stored in the database module with the audio file (or a link to the audio file), along with the waveform data associated with the audio file, such as the author, performer, recording date, recording location, and like metadata. In such a manner, many optical codes are produced and stored in the database module.

Meanwhile, the user may publish the optical code as artwork, or in book form, on websites, or the like. When presumably a different user sees the optical code and is curious as to what audio the optical code represents, the user can then scan the optical code with a phone camera to produce a code image and send the code image to the code matching system.

The code matching system comprises an image size normalization (ISN) module, an image pixelating (IP) module, an image comparison (IC) module, and a delivery module, all running on the server and resident on the NVSS. In some cases a portion of the code matching system may reside on a user's smartphone or other portable electronic device.

As such, the optical code most closely matching the code image is selected as the best match, and the audio file and related waveform data is returned to the user requesting the match with the delivery module.

The present invention is a system that can use the image of the waveform artwork itself as a digital code, scanned or photographed using a variety of equipment, lighting conditions, sizes and quality. The present system matches the image provided with the original data or audio waveform that was used to generate the waveform artwork, and, once the waveform artwork is identified by the system, the audio file is played back to the user. As such, the user can follow along with the waveform artwork to see that there is a relationship between the audio file and the waveform artwork. The system is also able to produce the waveform artwork by uploading an audio file to the system. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
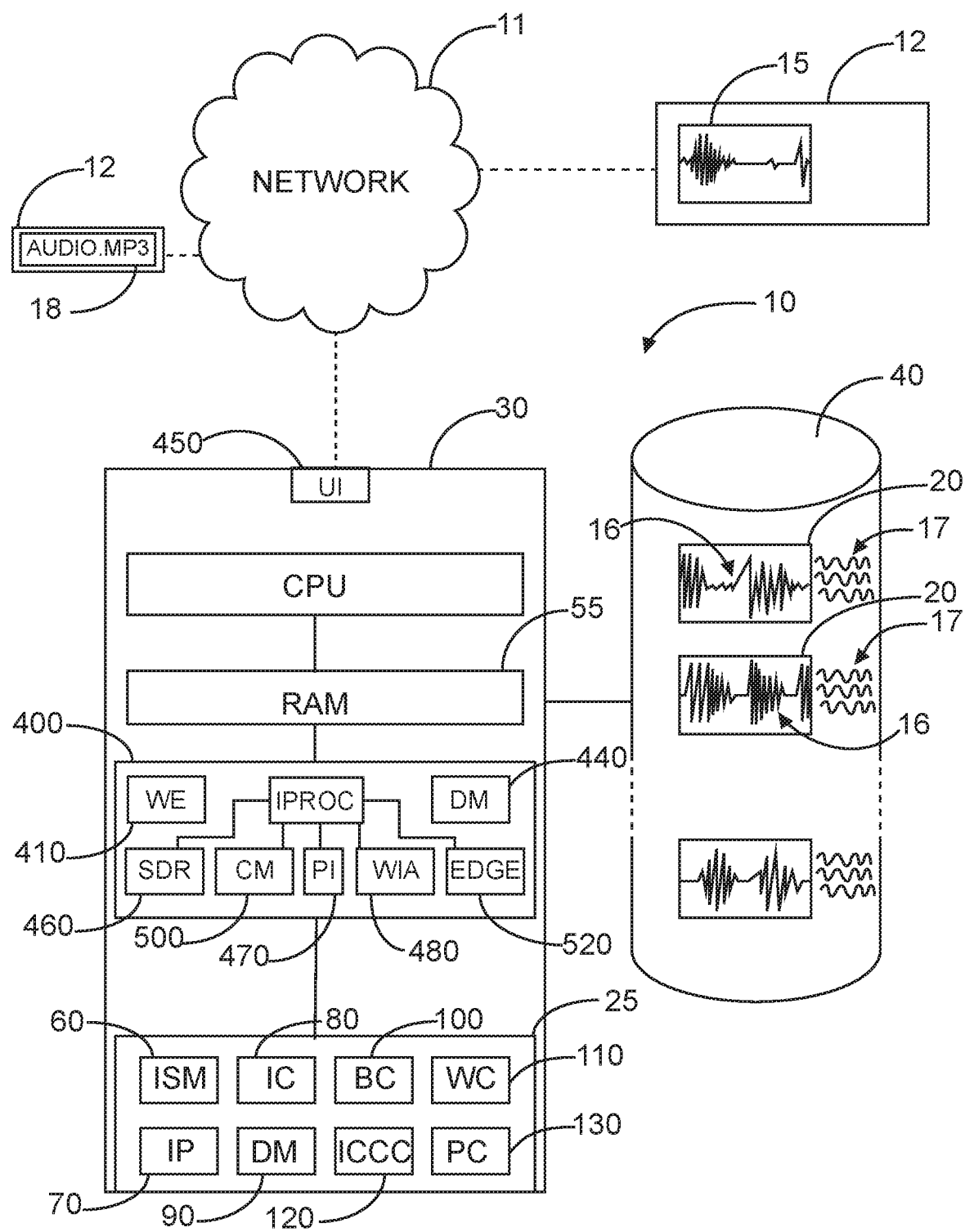
FIG. 1 is a system diagram of the invention.
Figure 2:
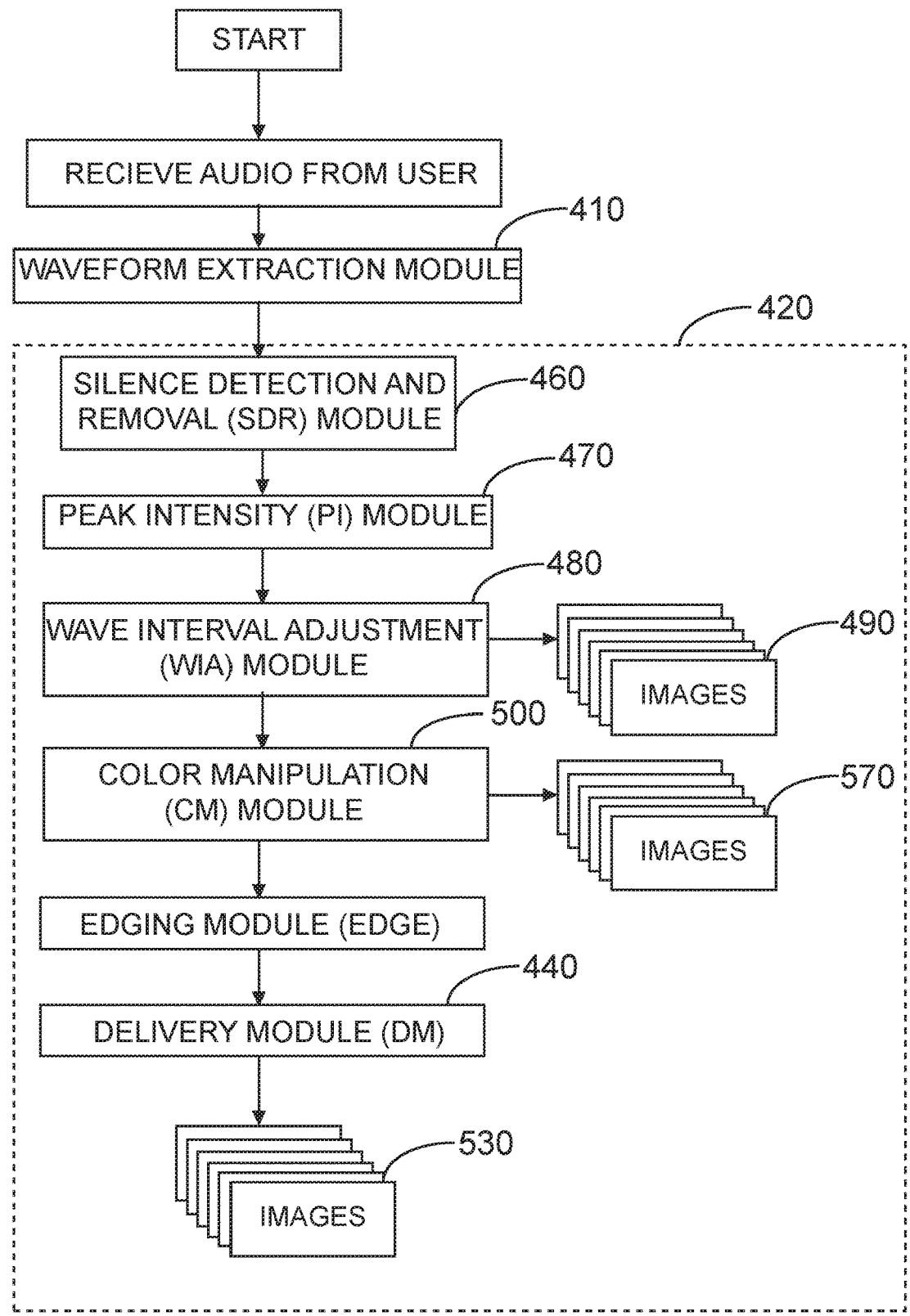
FIG. 2 is a flow diagram of a code generating system of the invention.
Figure 8:
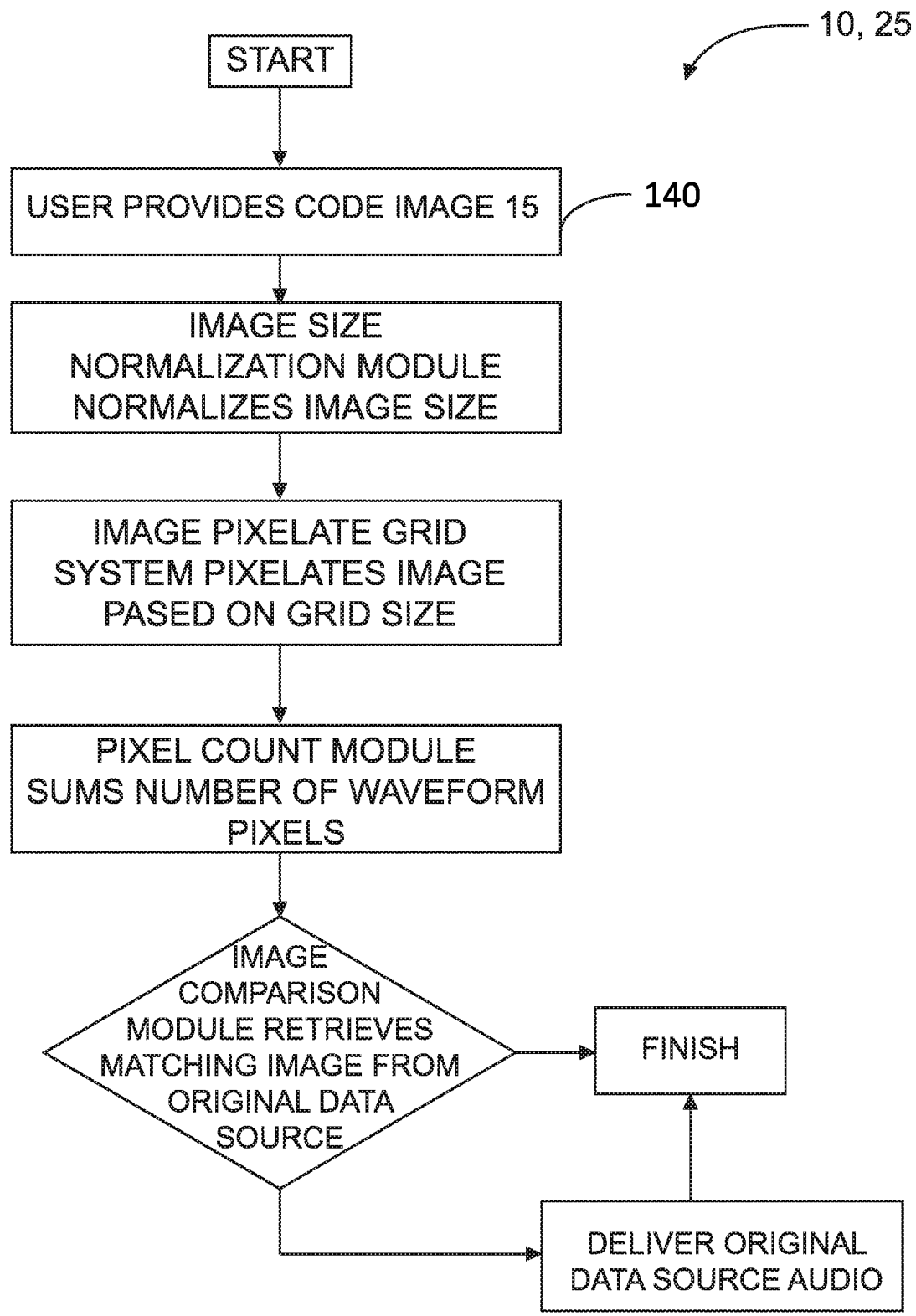
FIG. 8 is a flow diagram of a code matching system of the invention.

FIGS. 1, 2 and 8 illustrate an optical code system 10 for manipulating an optical code 20 that represents an audio waveform 16 (FIG. 13) present in an audio file 18. The audio file 18 may be a standard .mp3 or .wve or other audio file format, or may be the audio portion of a video file, for example.

The system 10 includes a server 30, a database module 40, and a Non-Volatile Storage System (NVSS) 50, all interconnected and preferably in communication with a network 11 to remote users 12.

Figure 19:
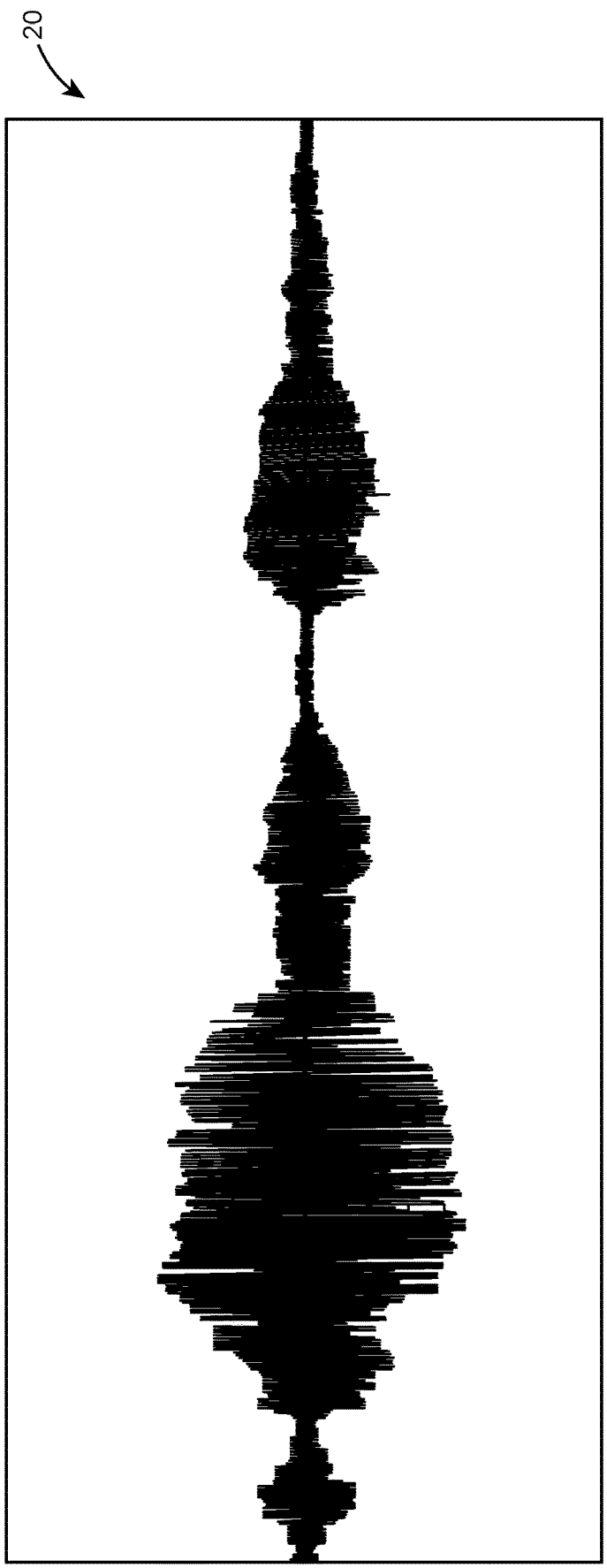
FIG. 19 is the optical code generated from the normalized waveform image.

The system 10 includes two primary sub-systems, namely a code generating system 400 (FIG. 2) and a code matching system 25 (FIG. 8). The code generating system 400 generates an optical code 20 (FIG. 19) based on the audio waveform 16, such an optical code 20 being read and identified by the code matching system 25. As such, once the code matching system 25 matches an optical code 20 to a particular audio waveform 16, the associated audio file 18 and associated waveform data 17 may be delivered to the user 12. An important feature of the optical code 20 is that it visually matches or resembles the actual audio waveform 16; that is to say, the optical code 20 visually resembles the data to which it is linked. As such, the user 12 can begin himself to recognize the optical code 20 an associate the optical code 20 to an audio signal or other data.

The code generating system 400 comprises, at a minimum, a Waveform Extraction (WE) module 410, an Image Processing (IPROC) module 420, and a Delivery Module (DM) 440, all of which are running on the server 300 and resident in the NVSS 50.

Figure 13:
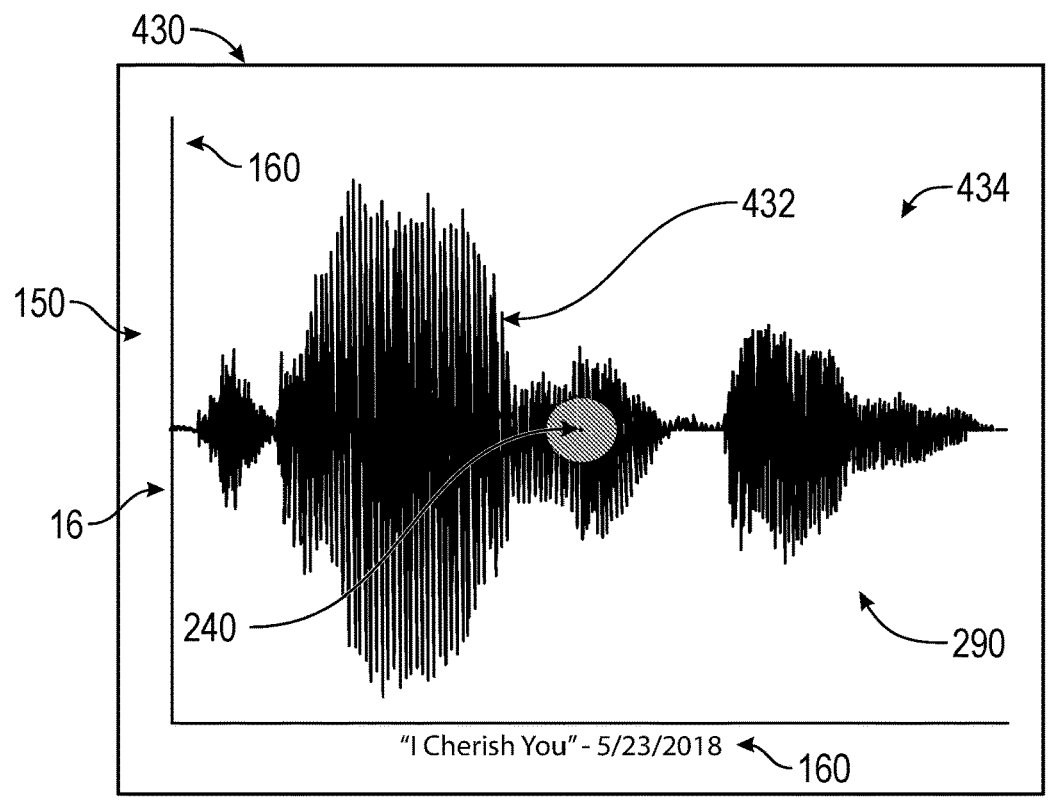
FIG. 13 is a waveform image generated by the code generating system.
Figure 14:
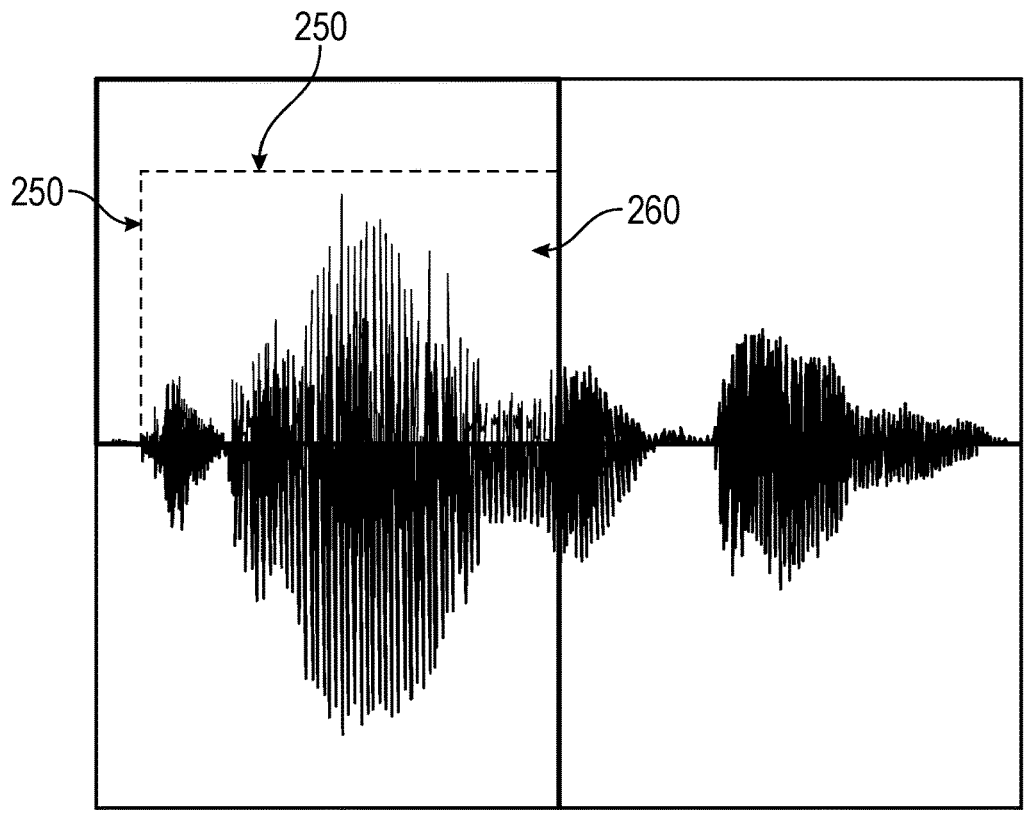
FIG. 14 is the waveform image showing a first quadrant scanned with the image contrast comparison loop module of FIG. 10.
Figure 15:
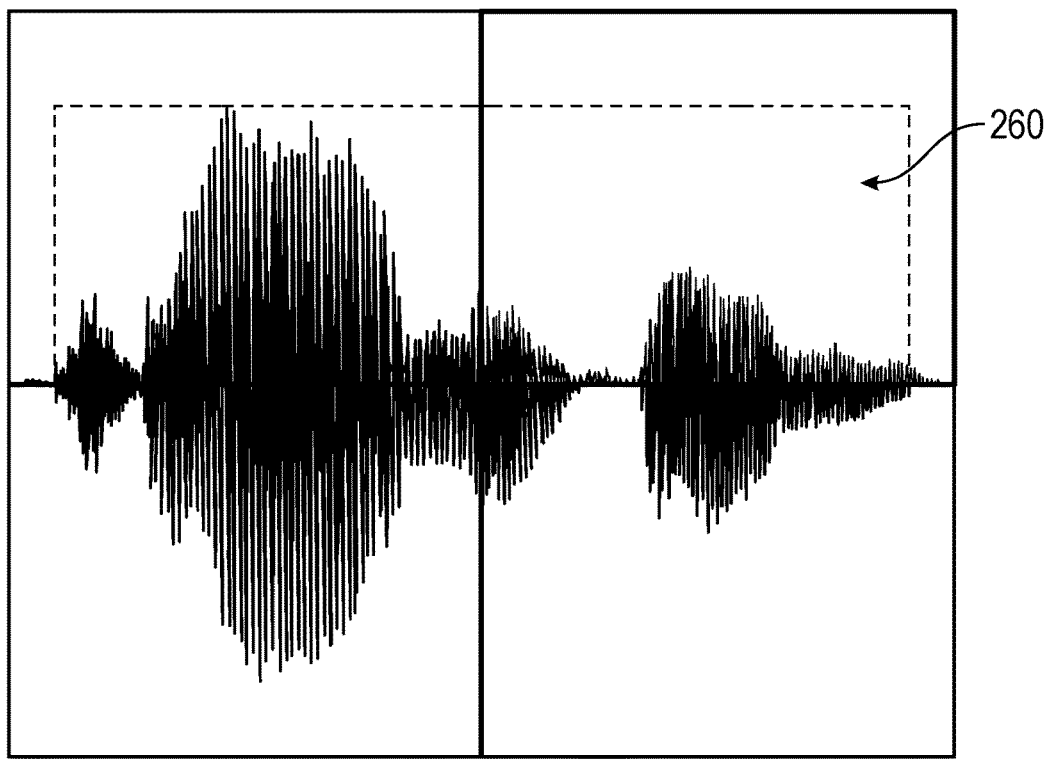
FIG. 15 is the waveform image showing a second quadrant scanned with the image contrast comparison loop module of FIG. 10.
Figure 16:
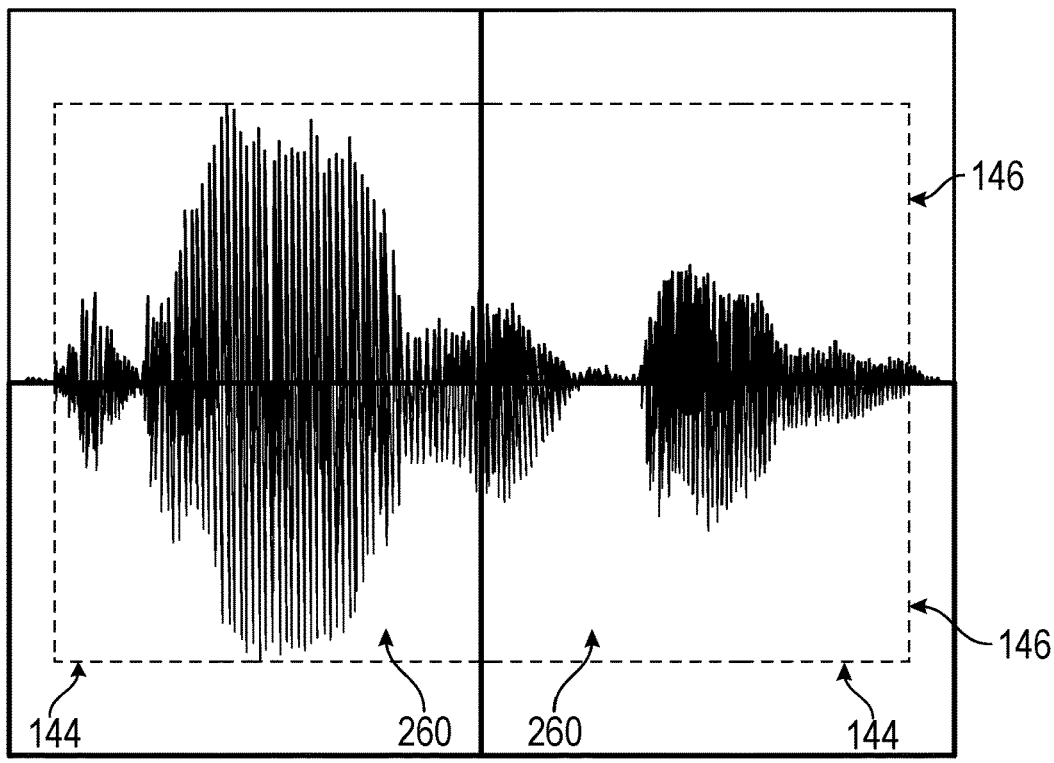
FIG. 16 the waveform image showing a third and fourth quadrant scanned with the image contrast comparison loop module of FIG. 10.

The waveform extraction module 410 receives the audio file 18 from the user 12, preferably through a user interface 450, and extracts audio data 19 from the audio file 18 (FIG. 13).

The audio data 19 is then sent to the image processing module 420 that receives the audio data 19 from the waveform extraction module 410 and transforms the audio data 19 into a waveform image 430 of a predetermined size. The waveform image 430 is normalized and rendered with a predetermined or user-set waveform color 432 and areas in a background of the waveform image 430 are rendered with a predetermined or user-set background color 434. The image processing module 420 preferably includes a Silence Detection and Removal (SDR) module 460, a Peak Intensity (PI) module 470, a Wave Interval Adjustment (WIA) module, a Color Manipulation (CM) module 500, and an edging (EDGE) module 520.

Figure 3:
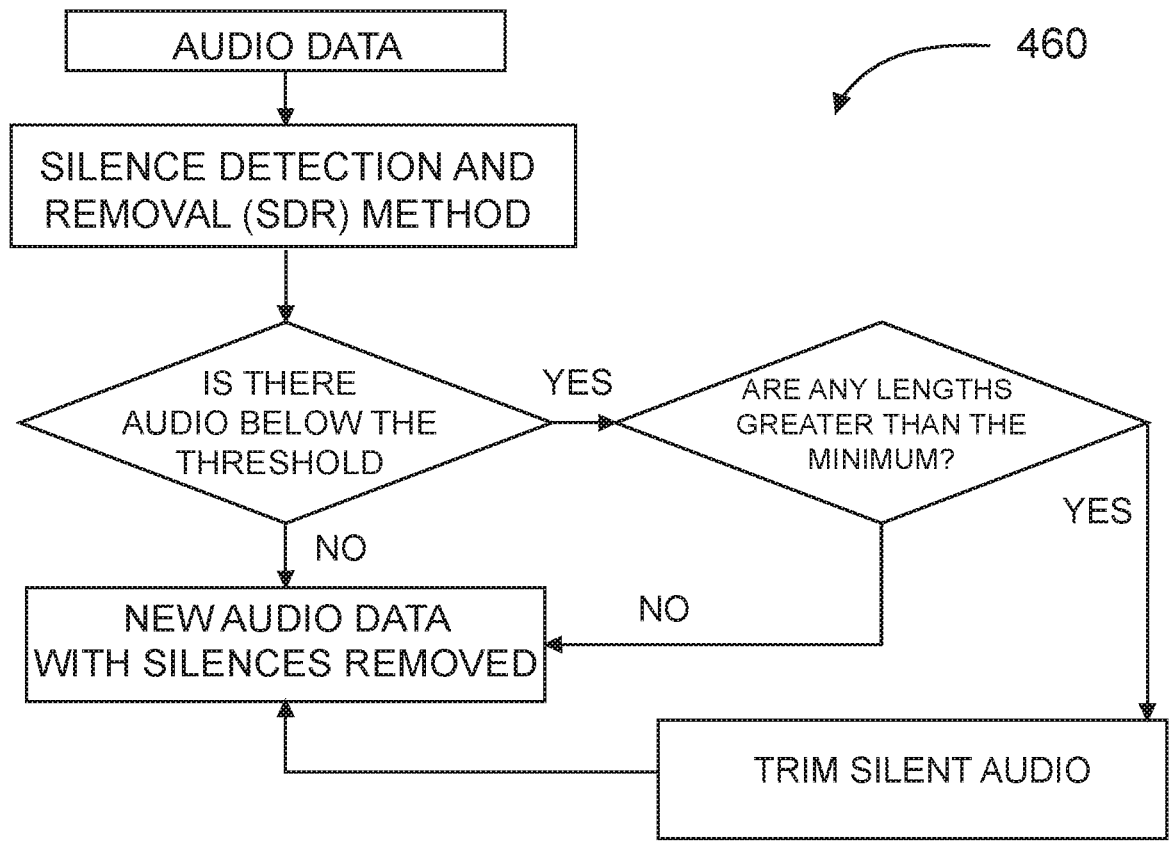
FIG. 3 is a flow diagram of a silence detection and removal module of the invention.

The silence detection and removal module 460 (FIG. 3) detects portions of the audio data 19 that represent silence, that is, do not rise above a minimum volume threshold for a predetermined minimum amount of time. If silent portions of the audio data 19 are detected they are removed from the audio data 19.

Figure 4:
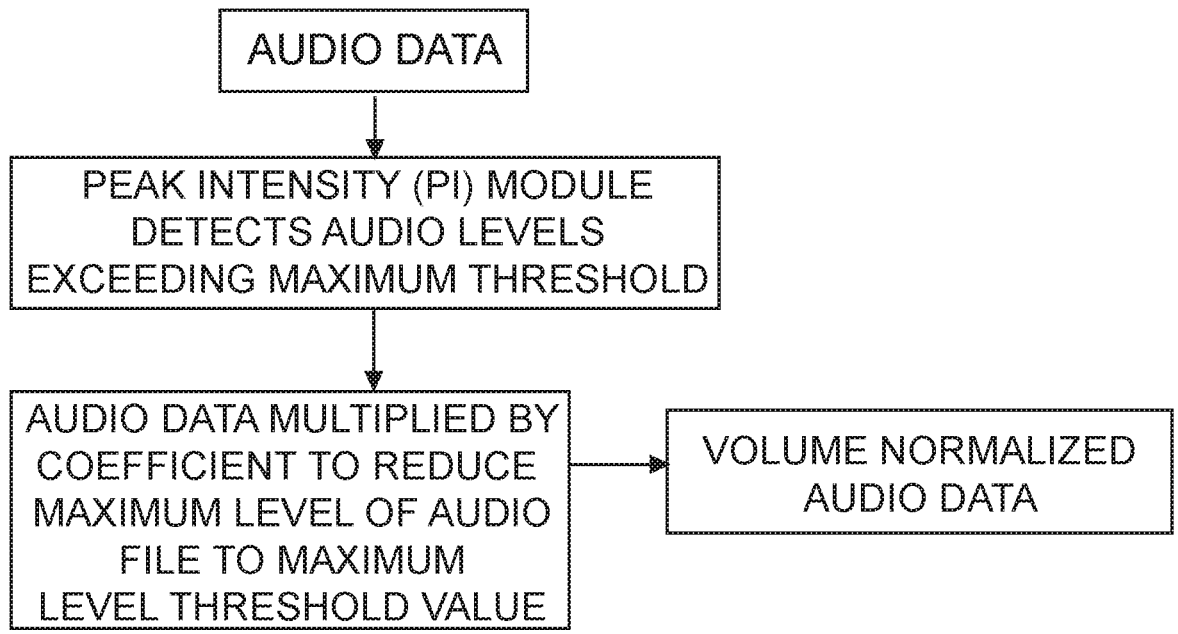
FIG. 4 is a flow diagram of a peak intensity module of the invention.

The peak intensity module 470 (FIG. 4) detects portions of the audio data 19 that represent audio volume levels exceeding a predetermined maximum threshold, and if found, multiplies the audio data 19 by a coefficient equal to the maximum threshold divided by the maximum volume level detected, such that the maximum volume level in the audio data 19 because equal to the maximum volume level threshold, with the remaining data scaled accordingly. As such, audio files 18 having relatively high or low volumes are both normalized to the predetermined maximum volume threshold.

Figure 5:
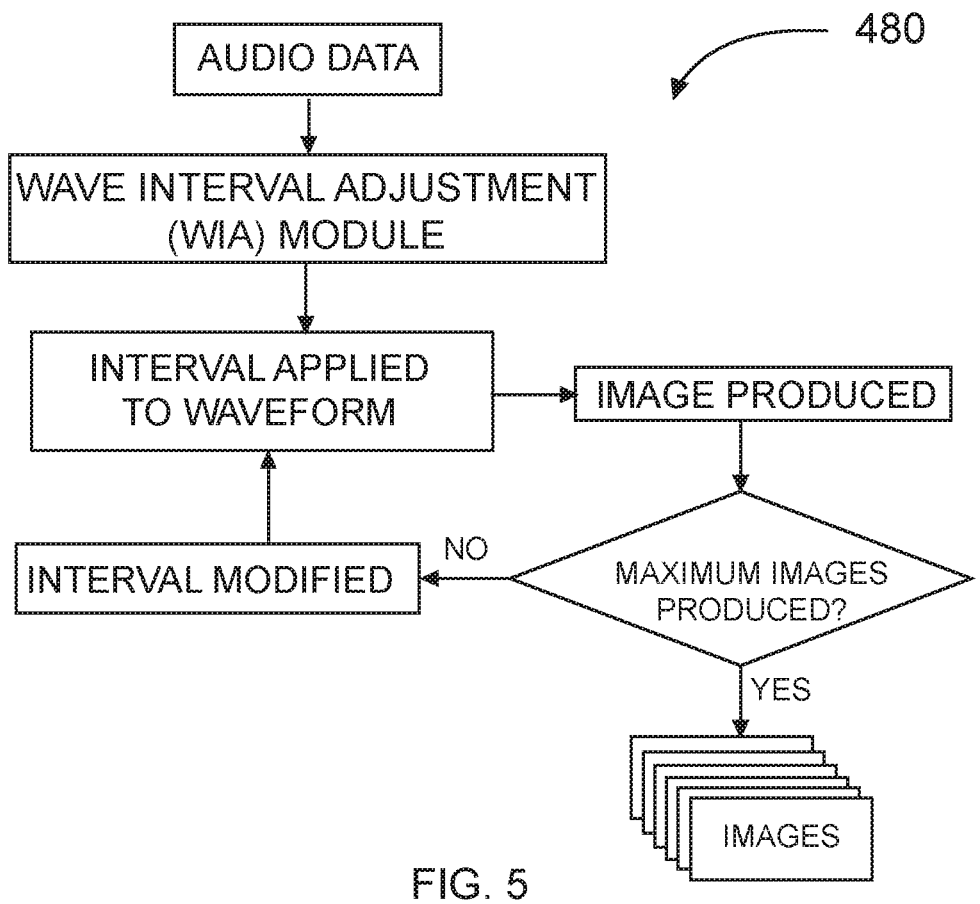
FIG. 5 is a flow diagram of a wave interval adjustment module of the invention.

The wave interval adjustment module 480 (FIG. 5) produces a first set of candidate wave images 490 by sending subsets of the audio data 19 to the waveform extraction module 410 for a predetermined number of different intervals of the audio data 19. For example, the number of intervals may be set to three, with the first interval being the first 67% of the audio data 19, a second interval being the middle two-thirds of the audio data 19, and the final interval being the last two-thirds of the audio data 19.

Figure 6:
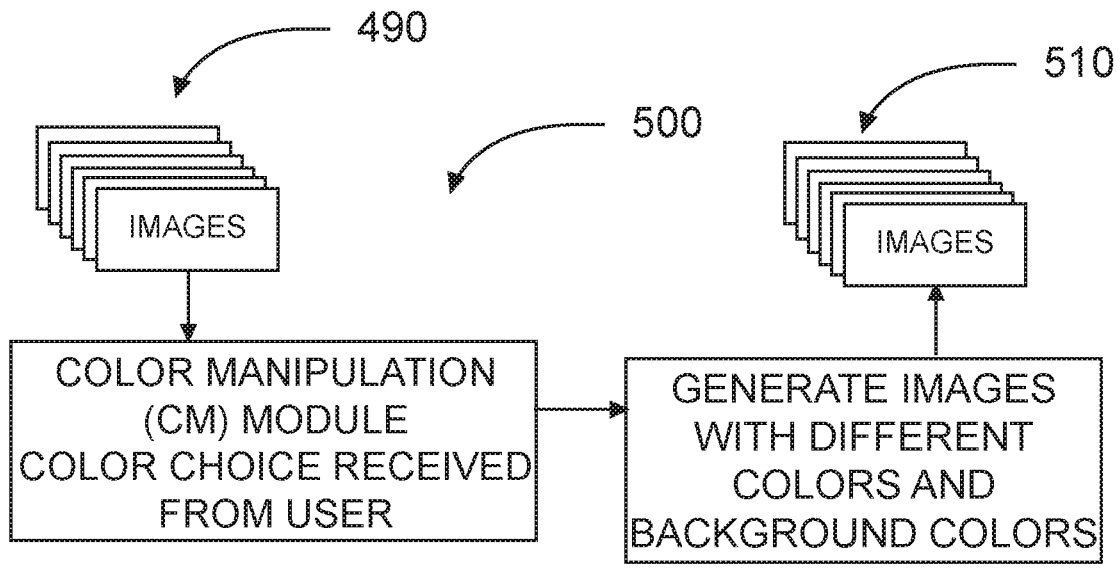
FIG. 6 is a flow diagram of a color manipulation module of the invention.

The color manipulation module 500 (FIG. 6) modifies the first set of candidate wave images 490, or just the wave image if the WIA module 480 is not present, by adjusting the waveform color 432 and the background color 434 based on either preset values or those dictated by the user 12 through the user interface 450. For example, some users 12 may prefer the waveform color 432 to be black and the background color 434 to be white, while other users 12 may prefer the waveform color 432 to be yellow and the background color 434 to be blue. For proper matching later with the code matching system 25, the only requirement is that the waveform color 432 be a contrasting color to the background color 434. The color manipulation module 500 preferably produces a second set of candidate waveform images 510 wherein each image has either a unique waveform color 432, a unique background color 434, or both.

Figure 7:
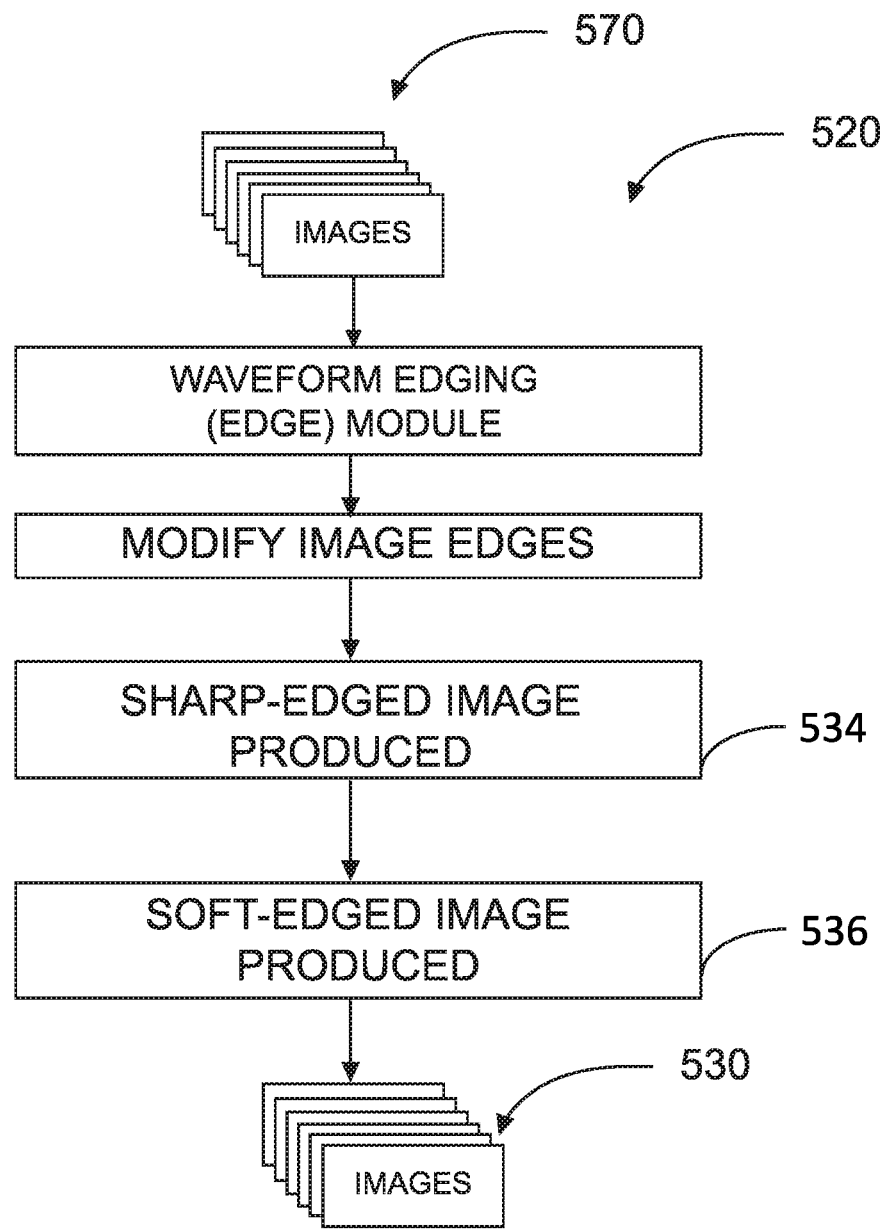
FIG. 7 is a flow diagram of an edging module of the invention.

The edging module 520 (FIG. 7) produces a third set of candidate waveform images 530 that include both a sharp-edge candidate image 534 and a soft-edge candidate image 536.

As such, the user 12 is able to select which of the candidate images is most appealing from the first, second, and third sets of candidate waveform images 490,510,530, through the user interface 450 via the network 11, assuming the user 12 is not local to the server 30. Once the optical code 20 is selected the optical code 20 is stored in the database module 40 with the audio file 18 (or a link to the audio file 18), along with the waveform data 17 associated with the audio file 18, such as the author, performer, recording date, recording location, and like metadata.

In such a manner, many optical codes 20 are produced and stored in the database module 40. Meanwhile, the user 12 may publish the optical code 20 as artwork, or in book form, on websites, or the like. When presumably a different user 12 sees the optical code 20 and is curious as to what audio the optical code represents, the user 12 can then scan the optical code 20 with a phone camera (not shown) or otherwise to produce a code image 15 and send the code image 15 to the code matching system 25.

The code matching system 25 (FIG. 8) comprises an Image Size Normalization (ISN) module 60, an Image Pixelating (IP) module 70, an Image Comparison (IC) module 80, and a Delivery Module (DM) 90, all running on the server 30 and resident on the NVSS 50.

Figures 9, 10:
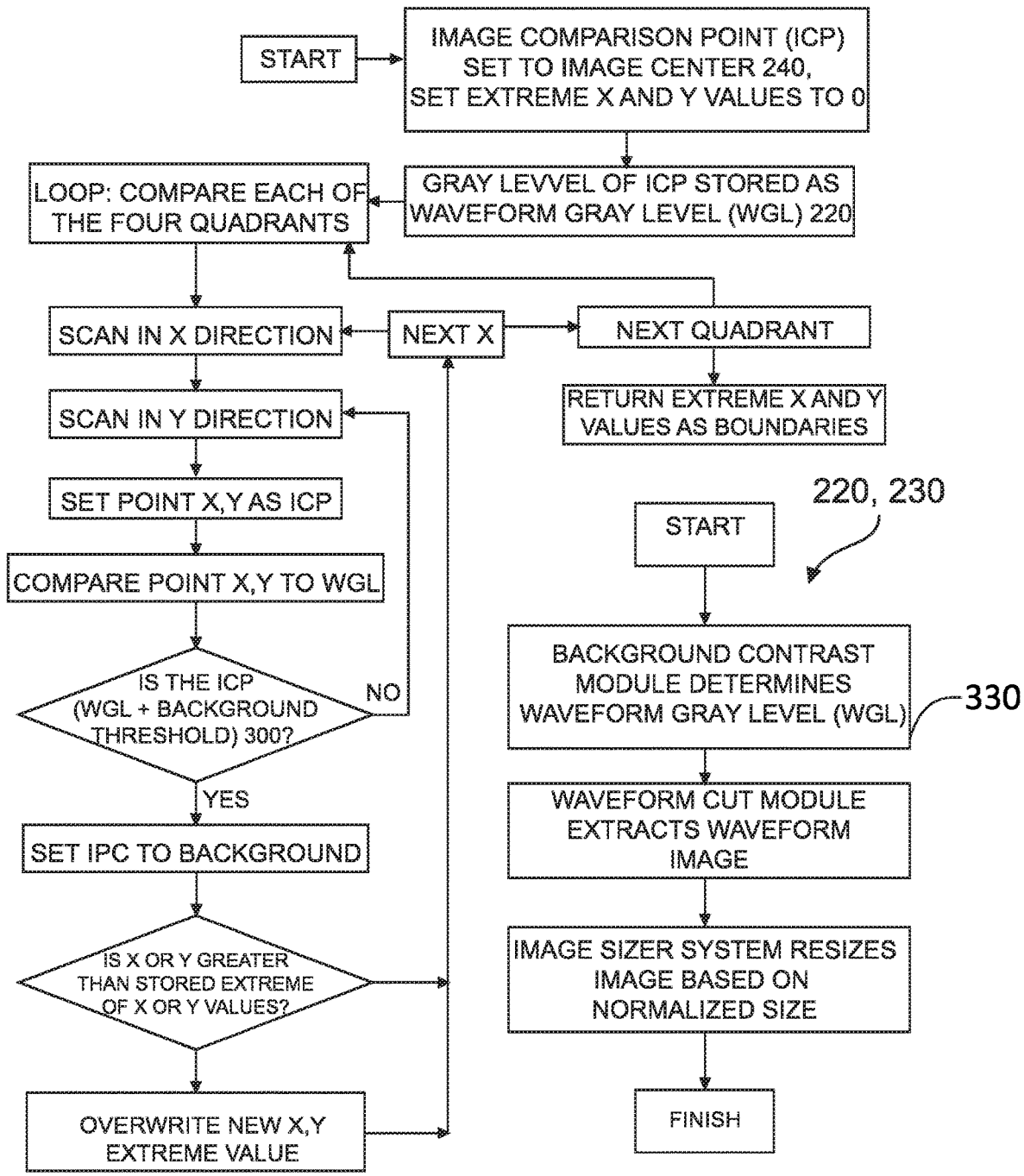
FIG. 9 is a flow diagram of a background contrast module of the invention.
FIG. 10 is a flow diagram of an image contrast comparison loop module of the invention.
Figure 17:
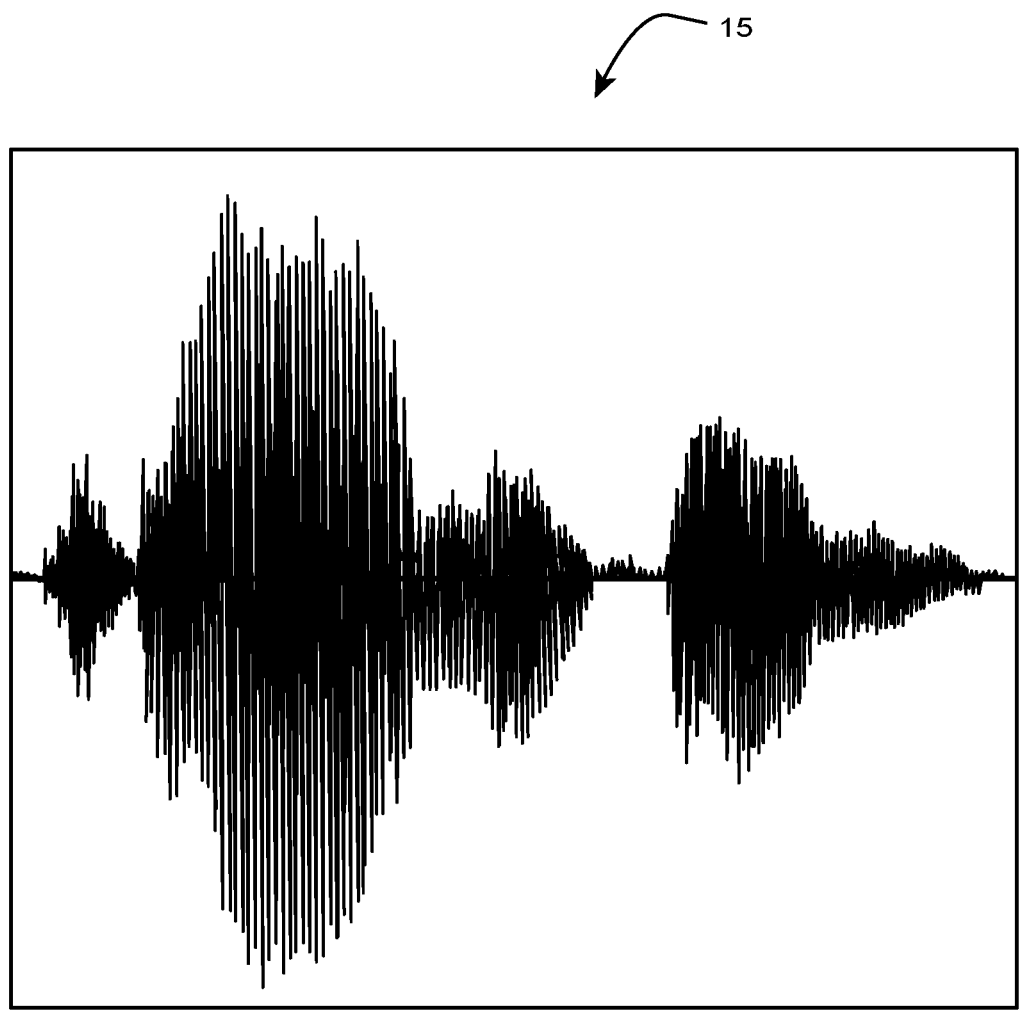
FIG. 17 is a normalized waveform image produced by the image processing module.
Figure 18:
FIG. 18 is a size normalized waveform generated from the normalized waveform image.

The image size normalization module 60 receives the code image 15 from the user 12 and determines the boundaries 140 of the code image 15, preferably with a Background Contrast (BC) module 100 (FIG. 9) that is configured to set a Waveform Gray Level (WGL) variable 220 as a gray level of a pixel at a center point 240 of the code image 15. The code image 15 may be rotated and centered first so that the center point 240 is most likely directly on a portion of the code image 15 that represents the waveform 16. A Waveform Cut (WC) module is preferably included to trim the code image 15 to the edges 250 of the waveform 16 (FIG. 17) in accordance with the edge boundaries returned by the BC module 100. The image size normalization module 60 further removes whitespace 150 and any border artifacts 160 (FIG. 13) in the code image 15. The resulting code image 15 is then resized to a predetermined normalized image size, the result being a normalized image 170 (FIG. 18).

The background contrast module 100 preferably compares each pixel of the code image 15 to the WGL 220 with an Image Contrast Comparison Loop (ICCL) module 120 (FIG. 10) that is configured to examine each pixel, starting in the center point 240 and emanating outwardly in a first quadrant 260. One way this can be accomplished is by including a pair of nested loops 270. An outer loop 271 of the nested loops 270 counts away from the center point 240 horizontally, and an inner loop 272 of the nested loops 270 counts away from a horizontal loop position X vertically to determine an Image Comparison Pixel (ICP) 280 at (X,Y) to analyze. If the difference in gray level between the ICP 280 and the WGL 220 exceeds a predetermined background threshold 300, then for each horizontal loop position X a volume level 310 is defined as the vertical position within the inner loop 272 wherein the ICP 280 is first assigned as background 290. Each other pixel in each other quadrant in turn is then compared with the WGL 220, after which the further horizontal positions away from the center point 240 define horizontal edge boundaries 144 of the waveform 16 if either the edge of the code image 15 is reached or a minimum volume level threshold 320 is reached. The maximum and minimum vertical values of the code image 15 define the vertical edge boundaries 146 of the waveform 16.

The image contrast comparison loop module 120 is also preferably configured to normalize all pixels defined as background 290 with a Background Gray Level (BGL) value 330, and all pixels not defined background 290 are assigned the WGL value 220. For example, the WGL 220 may be assigned black (# FFFFFF), whereas the BGL 330 may be assigned white (#000000).

Figure 11:
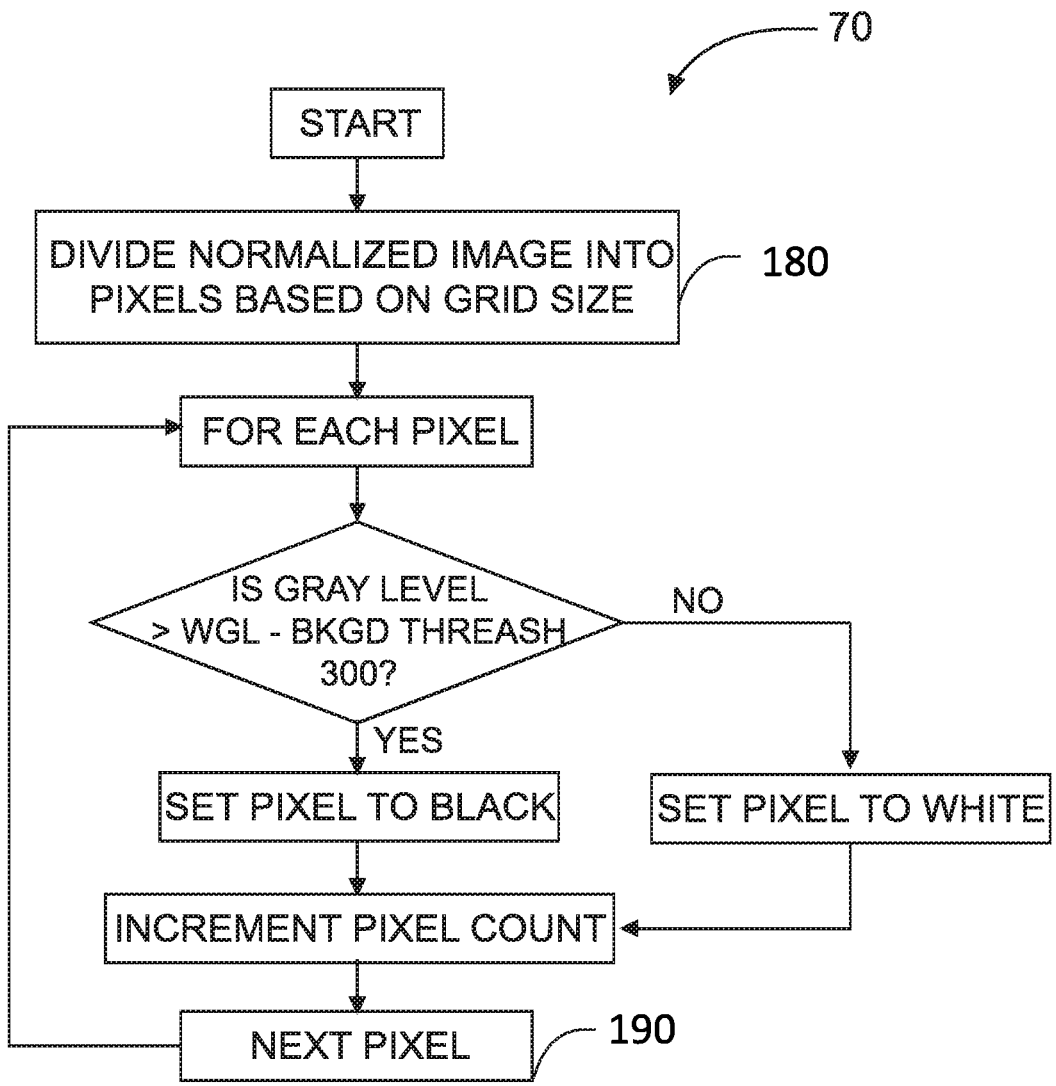
FIG. 11 is a flow diagram of an image pixelating module of the invention.

Alternately, the image pixelating module 70 (FIG. 11) may be configured to convert each pixel in the normalized image 170 to its nearest gray level value and then to test if the pixel is within the background threshold 300 of the WGL 220. If so, then the pixel is converted to black, and if not the pixel is converted to the BGL 330. Each pixel may be accessed utilizing a pair of nested loops, as with the ICCL module 120 mentioned above. Once the normalized image 170 is converted into normalized pixels 180 based on a predetermined grid size, the result is a pixelated image 190.

Figure 12:
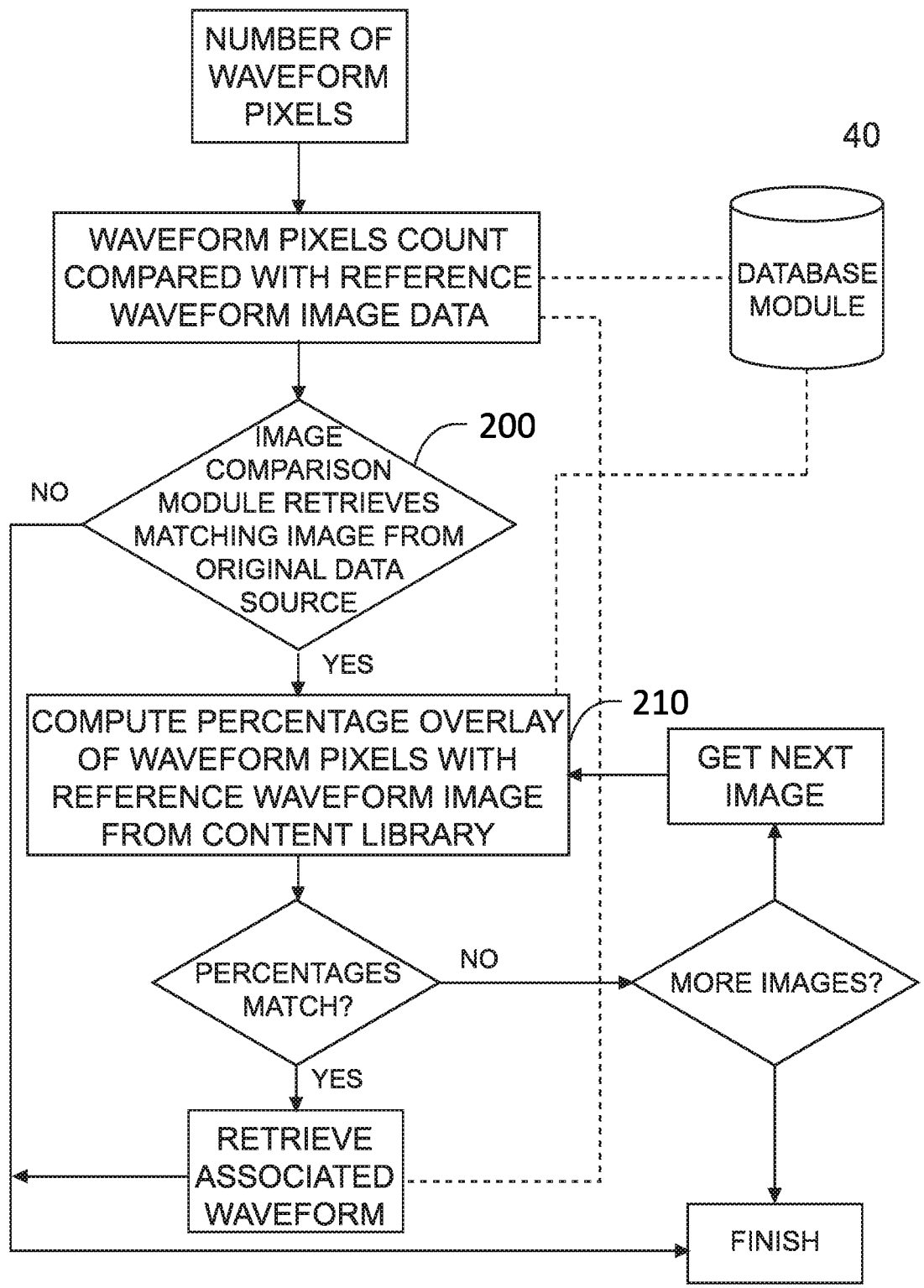
FIG. 12 is a flow diagram of an image comparison module of the invention.

The image comparison module 80 (FIG. 12) then compares the pixelated image 190 with a comparison set 200 of the optical codes 20 stored in the database module 40. The IC module 80 calculates an overlap percentage 210 between the pixelated image 190 and each optical code 20 in the comparison set 200. Any of the optical codes 20 resulting in an overlap percentage higher than a predetermined threshold, such as 95%, are designated as a match.

The comparison set 200 of optical codes 20, in one embodiment, is taken from all of the optical codes 20 stored in the database module 40. Alternatively, a pixel count module 130 is configured to count the number of pixels 180 present in the pixelated image 190. The result for each optical code 20 is a pixel count 350 stored in the database module 40 and associated with the optical code 20. In such an embodiment, the comparison set 200 of the optical codes 20 may be taken from those optical codes 20 stored in the database module 40 that have a pixel count within a predetermined pixel range of the pixel count o the pixelated image 190.

As such, the optical code 20 most closely matching the code image 15 is selected as the best match, and the audio file 18 and related waveform data 17 is returned to the user 12 requesting the match with the delivery module 90. Clearly part of the system 10, particularly that including the user interface 450, may reside on a user's portable electronic device, such as a smartphone (not shown). As such, the system 10 is at least partially distributed such that the portion residing on the user's smartphone cooperates with the system 10 on the server 30, typically through the network 11.

While a particular form of the invention has been illustrated and described, it will be apparent that various modifications can be made without departing from the spirit and scope of the invention. For example, the data illustrated and described herein is audio data, but other types of data may be utilized as well, such as visual data of, for example, famous artwork. The optical code 20 in such a case may be a thumbnail image of the artwork. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An optical code system for manipulating an optical code representing an audio waveform present in an audio file, comprising:

a server, a database module, and a non-volatile storage system (NVSS);

a code generating system comprising:

a waveform extraction module running on the server, resident on the non-volatile storage system, and configured to receive the audio file and to extract audio data therefrom;

an image processing module running on the server, resident on the non-volatile storage system, and configured to receive the audio data from the waveform extraction module and transform the audio data into a waveform image of a predetermined size, the waveform image having a waveform color and areas in a background of the waveform image having a background color, the waveform image visually representative of the audio waveform;

a delivery module running on the server, resident on the non-volatile storage system, and configured to interact with a user through a user interface to deliver the waveform image to the user;

wherein the database module stores a plurality of optical codes and an associated audio waveform and waveform data associated therewith, and further including a code matching system comprising:

an Image Size Normalization (ISN) module running on the server, resident on the NVSS, and configured to receive a code image from the user, the ISN module determining boundaries of the code image, removing whitespace and border artifacts in the code image, cropping the code image, and then resizing the code image to a predetermined normalized image size, the result being a normalized image;

an Image Pixelating (IP) module running on the server, resident on the NVSS, and configured to divide the normalized image into pixels based on a predetermined grid size, the result being a pixelated image;

an Image Comparison (IC) module running on the server, resident on the NVSS, and configured to compare the pixelated image with a comparison set of the optical codes stored in the database module, the IC module calculating an overlap percentage with each optical code in the comparison set and the pixelated image, any of the optical codes resulting in an overlap percentage higher than a predetermined threshold being designated as a match;

a delivery module running on the server, resident on the NVSS, and configured to return to the user, an optical code designated as a match and having the highest overlap percentage, and associated audio waveform and waveform data.

2. The system of claim 1 wherein the image processing module further includes a silence detection and removal module configured for detecting portions of the audio data that represent silence, and removing such portions before generating the waveform image.

3. The system of claim 1 wherein the image processing module further includes a peak intensity module configured for detecting portions of the audio data that represent audio volume levels exceeding a predetermined maximum threshold, and multiplying all of the audio data by a coefficient sufficient to reduce the maximum audio volume levels in the audio data to the predetermined maximum threshold before generating the waveform image.

4. The system of claim 1 wherein the image processing module further includes a wave interval adjustment system configured for sending a subset of the audio data to a waveform generator for each of a predetermined number of different intervals of the audio data, producing a first set of candidate wave images.

5. The system of claim 1 wherein the image processing module further includes a color manipulation module adapted for modifying the waveform color and the background color based on user input through the user interface.

6. The system of claim 5 wherein the color manipulation module is adapted to produce a second set of candidate waveform images, each image having either unique waveform colors, background colors, or both, based on user input through the user interface.

7. The system of claim 1 wherein the image processing module further includes an edging module configured for producing a third set of candidate waveform images that include both a sharp-edged candidate image and a soft-edged candidate image.

8. The system of claim 1 wherein the ISN module determines the boundaries of the code image with a Background Contrast (BC) module that is configured to set a Waveform Gray Level (WGL) variable as a gray level of a pixel at a center point of the code image, comparing each pixel emanating outwardly from the center point of the code image with the WGL variable to determine edges of the audio waveform in each of four quadrants, and returning the edge boundaries of the audio waveform to the ISN module.

9. The system of claim 8 wherein the ISN module includes a Waveform Cut (WC) module that crops the code image in accordance with the edge boundaries returned by the BC module.

10. The system of claim 9 wherein the BC module compares a pixel with the WGL variable with an Image Contrast Comparison Loop (ICCL) module that is configured to examine each pixel emanating outwardly from the center point of the code image by using a pair of nested loops to compare each pixel in turn with the WGL variable in a first quadrant away from the center portion, an outer loop of the nested loops counting away from the center point horizontally, an inner loop of the nested loops counting away from a horizontal loop position vertically to determine an Image Comparison Pixel (ICP), the ICP being assigned as background if a difference in gray level between the ICP and the WGL variable exceeds a predetermined background threshold, for each horizontal loop position a volume level being defined as a vertical position within the inner loop wherein the ICP is first assigned as background, each other pixel in each other quadrant being compared with the WGL variable in turn, after which the furthest horizontal positions away from the center point define horizontal edge boundaries of the audio waveform if either an edge of the code image is reached or a minimum volume level threshold is reached, and the maximum and minimum vertical values of the code image defining vertical edge boundaries of the audio waveform.

11. The system of claim 10 wherein the ICCL module is configured to normalize all pixels defined as background with a Background Gray Level (BGL) value, and all pixels not defined as background with the WGL variable.

12. The system of claim 10 wherein the IP module is configured to convert each pixel in the normalized image to its nearest gray level value and to test if the pixel is within the background threshold of the WGL variable, in which case the pixel is converted to black, otherwise the pixel is converted to a Background Gray Level (BGL) value.

13. The system of claim 1 wherein the comparison set of optical codes is taken from all of the optical codes stored in the database module.

14. The system of claim 1 further including a Pixel Count (PC) module running on the server, resident on the NVSS, and configured to count a number of pixels present in the pixelated image, the result being a pixel count; whereby the comparison set of optical codes is taken from those optical codes stored in the database module having a pixel count within a predetermined pixel range of the pixel count of the pixelated image.

15. A processor-implemented method of manipulating an optical code representing an audio waveform present in an audio file, comprising the steps:
providing a server, a database module, and a non-volatile storage system (NVSS);
a waveform extraction module running on the server, resident on the non-volatile storage system, receiving the audio file and extracting audio data therefrom;
an image processing module running on the server, resident on the non-volatile storage system, receiving the audio data from the waveform extraction module and transforming the audio data into a waveform image of a predetermined size, the waveform image having a waveform color and areas in a background of the waveform image having a background color, the waveform image visually representative of the audio waveform;
a delivery module running on the server, resident on the non-volatile storage system, interacting with a user through a user interface to deliver the waveform image to the user;
wherein the database module stores a plurality of optical codes and an associated audio waveform and waveform data associated therewith, and further includes:
an Image Size Normalization (ISN) module running on the server, resident on the NVSS, and configured to receive a code image from the user, the ISN module determining boundaries of the code image, removing whitespace and border artifacts in the code image, cropping the code image, and then resizing the code image to a predetermined normalized image size, the result being a normalized image;
an Image Pixelating (IP) module running on the server, resident on the NVSS, and configured to divide the normalized image into pixels based on a predetermined grid size, the result being a pixelated image;
an Image Comparison (IC) module running on the server, resident on the NVSS, and configured to compare the pixelated image with a comparison set of the optical codes stored in the database module, the IC module calculating an overlap percentage with each optical code in the comparison set and the pixelated image, any of the optical codes resulting in an overlap percentage higher than a predetermined threshold being designated as a match;

a delivery module running on the server, resident on the NVSS, and configured to return to the user, an optical code designated as a match and having the highest overlap percentage, and associated audio waveform and waveform data.

16. The method of claim 15 further including the step:
the image processing module further including a silence detection and removal module detecting portions of the audio data that represent silence, and removing such portions before generating the waveform image.

17. The method of claim 15 further including the step:
the image processing module further including a peak intensity module detecting portions of the audio data that represent audio volume levels exceeding a predetermined maximum threshold, and multiplying all of the audio data by a coefficient sufficient to reduce the maximum audio volume levels in the audio data to the predetermined maximum threshold before generating the waveform image.

18. The method of claim 15 further including the step: the image processing module further including a wave interval adjustment system configured for sending a subset of the audio data to a waveform generator for each of a predetermined number of different intervals of the audio data, producing a first set of candidate wave images.

19. The method of claim 15 further including the step:
the image processing module further including a color manipulation module modifying the waveform color and the background color based on user input through the user interface.

20. The method of claim 19 further including the step:
the color manipulation module producing a second set of candidate waveform images, each image having either unique waveform colors, background colors, or both, based on user input through the user interface.

21. The method of claim 15 further including the step: the image processing module including an edging module producing a third set of candidate waveform images that include both a sharp-edged candidate image and a soft-edged candidate image.

22. A processor-implemented method for matching a code image with an optical code from a plurality of optical codes each representing an audio waveform associated with waveform data, comprising the steps:

providing a server, a database module, and a Non-Volatile Storage System (NVSS), the database module storing the plurality of optical codes and associated audio waveform and waveform data associated therewith;

an Image Size Normalization (ISN) module running on the server and resident on the NVSS, receiving the code image from a user, determining boundaries of the code image, removing whitespace and border artifacts in the code image, cropping the code image, and then resizing the code image to a predetermined normalized image size to produce a normalized image;

an Image Pixelating (IP) module running on the server and resident on the NVSS, dividing the normalized image into pixels based on a predetermined grid size to produce a pixelated image;

an Image Comparison (IC) module running on the server and resident on the NVSS, comparing the pixelated image with a comparison set of the optical codes stored in the database module, calculating an overlap percentage between each optical code in the comparison set and the pixelated image, and for any of the optical codes resulting in an overlap percentage higher than a predetermined threshold, designating the optical code as a match;

a delivery module running on the server and resident on the NVSS returning to the user, an optical code designated as a match and having the highest overlap percentage and associated audio waveform and waveform data.

23. The method of claim 22 further including the step: the ISN module determining the boundaries of the code image with a Background Contrast (BC) module; the BC module setting a Waveform Gray Level (WGL) variable as a gray level of a pixel at a center point of the code image, comparing each pixel emanating outwardly from the center point of the code image with the WGL variable to determine edges of the audio waveform in each of four quadrants, and returning the edge boundaries of the audio waveform to the ISN module.

24. The method of claim 23 further including the step:
the ISN module including a Waveform Cut (WC) module that crops the code image in accordance with the edge boundaries returned by the BC module.

25. The method of claim 24 further including the step: the BC module comparing a pixel with the WGL variable with an Image Contrast Comparison Loop (ICCL) module; the ICCL module examining each pixel emanating outwardly from the center point of the code image by using a pair of nested loops to compare each pixel in turn with the WGL variable in a first quadrant away from the center portion, an outer loop of the nested loops counting away from the center point horizontally, an inner loop of the nested loops counting away from a horizontal loop position vertically to determine an Image Comparison Pixel (ICP), the ICP being assigned as background if a difference in gray level between the ICP and the WGL variable exceeds a predetermined background threshold, for each horizontal loop position a volume level being defined as a vertical position within the inner loop wherein the ICP is first assigned as background, each other pixel in each other quadrant being compared with the WGL variable in turn, after which the furthest horizontal positions away from the center point define horizontal edge boundaries of the audio waveform if either an edge of the code image is reached or a minimum volume level threshold is reached, and the maximum and minimum vertical values of the code image defining vertical edge boundaries of the audio waveform.

26. The method of claim 25 further including the step: the ICCL module normalizing all pixels defined as background with a Background Gray Level (BGL) value, and all pixels not defined as background with the WGL variable.

27. The method of claim 25 further including the step: the IP module converting each pixel in the normalized image to its nearest gray level value and testing if the pixel is within the background threshold of the WGL variable, in which case the pixel is converted to black, otherwise the pixel is converted to a Background Gray Level (BGL) value.

28. The method of claim 22 further including the step:
the comparison set of optical codes being defined as all of the optical codes stored in the database module.

29. The method of claim 22 further including the step: a Pixel Count (PC) module running on the server and resident on the NVSS, counting a number of pixels present in the pixelated image to establish a pixel count, the comparison set of optical codes being taken from those optical codes stored in the database module having a pixel count within a predetermined pixel range of the pixel count of the pixelated image.

* * * * *